United States Patent
Ono (10) Patent No.: US 7,944,474 B2
(45) Date of Patent: May 17, 2011

(54) IMAGE PICKUP APPARATUS, IMAGE PICKUP METHOD AND PROGRAM

(75) Inventor: Toshiki Ono, Tokyo (JP)

(73) Assignee: Sony Corporation, Tokyo (JP)

( * ) Notice: Subject to any disclaimer, the term of this patent is extended or adjusted under 35 U.S.C. 154(b) by 1005 days.

(21) Appl. No.: 11/704,983

(22) Filed: Feb. 12, 2007

(65) Prior Publication Data

US 2007/0206935 A1    Sep. 6, 2007

(30) Foreign Application Priority Data

Feb. 22, 2006    (JP) ................. 2006-045159

(51) Int. Cl.
*H04N 5/228* (2006.01)
*G03B 17/00* (2006.01)
(52) U.S. Cl. .......... 348/208.12; 348/208.4; 396/55
(58) Field of Classification Search .......... 348/208.1, 348/208.4, 208.12, 208.99–208.16; 396/52–55, 396/153, 235, 236
See application file for complete search history.

(56) References Cited

U.S. PATENT DOCUMENTS

| | | | | |
|---|---|---|---|---|
| 5,353,091 A * | 10/1994 | Ishida et al. | ................... | 396/55 |
| 5,940,630 A * | 8/1999 | Washisu | ......................... | 396/55 |
| 6,933,968 B2 * | 8/2005 | Yamazaki | ............... | 348/208.12 |
| 2003/0059215 A1 * | 3/2003 | Kobayashi | ...................... | 396/64 |
| 2004/0239771 A1 * | 12/2004 | Habe | ........................ | 348/208.12 |

FOREIGN PATENT DOCUMENTS

| | | |
|---|---|---|
| JP | 2001-271732 | 10/2001 |
| JP | 2004-191885 | 7/2004 |

* cited by examiner

*Primary Examiner* — Sinh Tran
*Assistant Examiner* — Mark Monk
(74) *Attorney, Agent, or Firm* — Rader, Fishman, Grauer PLLC (57) ABSTRACT

An image pickup apparatus which includes a camera shake correction mechanism and determines exposure conditions including at least a shutter speed in response to brightness of an image pickup object, including acquisition means, decision means, and setting means. The acquisition means is configured to acquire a focal distance of a lens for converging an optical image of the image pickup object. The decision means is configured to decide a camera shake limit shutter speed corresponding to the acquired focal distance. The setting means is configured to set, where the camera shake correction mechanism is valid, a shutter speed lower than the camera shake limit shutter speed by an amount corresponding to a predetermined difference in exposure value to one end of a setting range of the shutter speed of the exposure condition.

8 Claims, 6 Drawing Sheets

| TABLE NUMBER N | FOCAL DISTANCE ft (mm) | CAMERA SHAKE LIMIT SHUTTER SPEED Ts (SECONDS) |
|---|---|---|
| 1 | 1 | 1 |
| 2 | 2 | 1/2 |
| 3 | 4 | 1/4 |
| 4 | 8 | 1/8 |
| 5 | 15 | 1/15 |
| 6 | 30 | 1/30 |
| 7 | 60 | 1/60 |
| 8 | 125 | 1/125 |
| 9 | 250 | 1/250 |
| 10 | 500 | 1/500 |
| 11 | 1000 | 1/1000 |
| 12 | 2000 | 1/2000 |
| 13 | 4000 | 1/4000 |

| TABLE NUMBER N | FOCAL DISTANCE ft (mm) | CAMERA SHAKE LIMIT SHUTTER SPEED Ts' WITH CAMERA SHAKE CORRECTION AMOUNT TAKEN INTO CONSIDERATION (SECONDS) |
|---|---|---|
| 1 | 1 | 8 |
| 2 | 2 | 4 |
| 3 | 4 | 2 |
| 4 | 8 | 1 |
| 5 | 15 | 1/2 |
| 6 | 30 | 1/4 |
| 7 | 60 | 1/8 |
| 8 | 125 | 1/15 |
| 9 | 250 | 1/30 |
| 10 | 500 | 1/60 |
| 11 | 1000 | 1/125 |
| 12 | 2000 | 1/250 |
| 13 | 4000 | 1/500 |

IMAGE PICKUP APPARATUS, IMAGE PICKUP METHOD AND PROGRAM

CROSS REFERENCES TO RELATED APPLICATIONS

The present invention contains subject matter related to Japanese Patent Application JP 2006-045159 filed with the Japanese Patent Office on Feb. 22, 2006, the entire contents of which being incorporated herein by reference.

BACKGROUND OF THE INVENTION

1. Field of the Invention

This invention relates to an image pickup apparatus and an image pickup method as well as a program, and more particularly to an image pickup apparatus and an image pickup method as well as a program wherein the shutter speed is set within a setting range.

2. Description of the Related Art

Where a still camera is used to pick up an image of a night view or a view at a dark place such as the inside of a room, since a comparatively low shutter speed may be required to obtain sufficient exposure, a camera shake is likely to occur. Further, also where a zoom lens is mounted on a still camera and the focal distance thereof is set to the telephoto side, a camera shake is likely to occur.

Generally, it is known that, where the focal distance of an image pickup lens is f millimeter, if an image is picked up at a shutter speed higher than 1/f second, then an image pickup miss arising from a camera shake is less likely to occur (refer to Japanese Patent Laid-Open No. 2001-271732, hereinafter referred to as Patent Document 1).

Thus, a method is in the related art available wherein the build up shutter speed of a program diagram corresponding to a set exposure mode is determined based on the focal distance f of the image pickup lens.

Also various methods are available wherein an image degraded by a camera shake is corrected in a digital camera.

SUMMARY OF THE INVENTION

As described above, according to the methods in the related art, a camera shake prevention countermeasure for limiting the shutter speed in order to prevent occurrence of a camera shake and a camera shake correction countermeasure for correcting an image against degradation arising from an actually occurring camera shake are available. However, no method has been proposed wherein the camera shake prevention counter measure and the camera shake correction countermeasure are integrated to determine an optimum shutter speed.

Therefore, it is demanded to provide an image pickup apparatus and an image pickup method as well as a program wherein an optimum exposure condition can be determined from within a wider setting range while an available camera shake correction mechanism is used.

According to the present invention, the setting range of the shutter speed is changed in response to the focal distance of a lens and also to the validity or invalidity of a camera shake correction function.

In particular, according to an embodiment of the present invention, there is provided an image pickup apparatus which includes a camera shake correction mechanism and determines exposure conditions including at least a shutter speed in response to brightness of an image pickup object, including an acquisition section configured to acquire a focal distance of a lens for converging an optical image of the image pickup object, a decision section configured to decide a camera shake limit shutter speed corresponding to the acquired focal distance, and a setting section configured to set, where the camera shake correction mechanism is valid, a shutter speed lower than the camera shake limit shutter speed by an amount corresponding to a predetermined difference in exposure value to one end of a setting range of the shutter speed of the exposure condition.

The decision section may decide the camera shake limit shutter speed corresponding to the acquired focal distance based on a table retained in advance therein and indicating a coordination relationship between the focal distance and camera shake limit shutter speed.

The predetermined difference in exposure value may be determined in advance in response to a correction capacity of the camera shake correction mechanism.

The image pickup apparatus may further include a detection section configured to detect an LV value which indicates the brightness of the image pickup object, an assumption section configured to assume a reference shutter speed corresponding to the detected LV value, a comparison section configured to compare the assumed reference shutter speed with the camera shake limit shutter speed, and a camera shake correction control section configured to control setting of validity or invalidity of the camera shake correction mechanism in response to a result of the comparison by the comparison section.

In this instance, the camera shake correction control section may invalidate the camera shake correction mechanism where the assumed reference shutter speed is higher than the camera shake limit shutter speed.

According to another embodiment of the present invention, there is provided an image pickup method for an image pickup apparatus which includes a camera shake correction mechanism and determines exposure conditions including at least a shutter speed in response to brightness of an image pickup object, including the steps of acquiring a focal distance of a lens for converging an optical image of the image pickup object, deciding a camera shake limit shutter speed corresponding to the acquired focal distance, and setting, where the camera shake correction mechanism is valid, a shutter speed lower than the camera shake limit shutter speed by an amount corresponding to a predetermined difference in exposure value to one end of a setting range of the shutter speed of the exposure condition.

According to a further embodiment of the present invention, there is provided a program for controlling an image pickup apparatus which includes a camera shake correction mechanism and determines exposure conditions including at least a shutter speed in response to brightness of an image pickup object, the program causing a computer to execute a process which includes the steps of acquiring a focal distance of a lens for converging an optical image of the image pickup object, deciding a camera shake limit shutter speed corresponding to the acquired focal distance, and setting, where the camera shake correction mechanism is valid, a shutter speed lower than the camera shake limit shutter speed by an amount corresponding to a predetermined difference in exposure value to one end of a setting range of the shutter speed of the exposure condition.

In the image pickup apparatus and method and the program, the camera shake limit shutter speed corresponding to the focal distance is decided. Then, where the camera shake correction mechanism is valid, a shutter speed lower than the camera shake limit shutter speed by an amount corresponding to a predetermined difference in exposure value is set to one end of a setting range of the shutter speed of the exposure condition.

With the image pickup apparatus and method and the program, while an image pickup miss by a camera shake is prevented, an optimum exposure condition can be determined. Further, an optimum exposure condition can be determined from within a wider setting range while an available camera shake correction mechanism is used.

DETAILED DESCRIPTION OF THE PREFERRED EMBODIMENT

Before a preferred embodiment of the present invention is described in detail, a corresponding relationship between several features recited in the accompanying claims and particular elements of the preferred embodiment described below is described. The description, however, is merely for the confirmation that the particular elements which support the invention as recited in the claims are disclosed in the description of the embodiment of the present invention. Accordingly, even if some particular element which is recited in description of the embodiment is not recited as one of the features in the following description, this does not signify that the particular element does not correspond to the feature. On the contrary, even if some particular element is recited as an element corresponding to one of the features, this does not signify that the element does not correspond to any other feature than the element.

Figure 1:
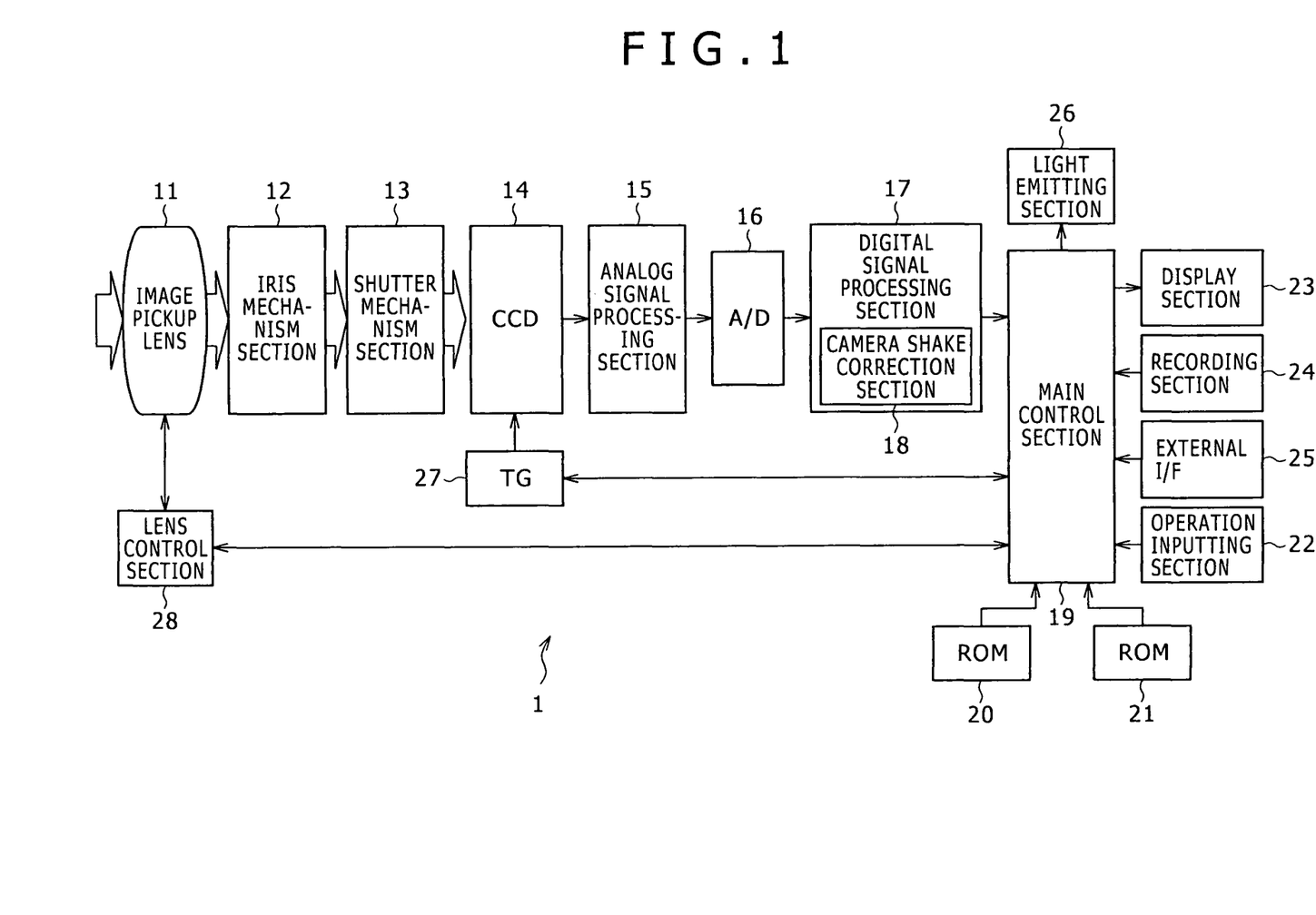
FIG. 1 is a block diagram showing an example of a configuration of a digital still camera to which the present invention is applied.
Figure 2:
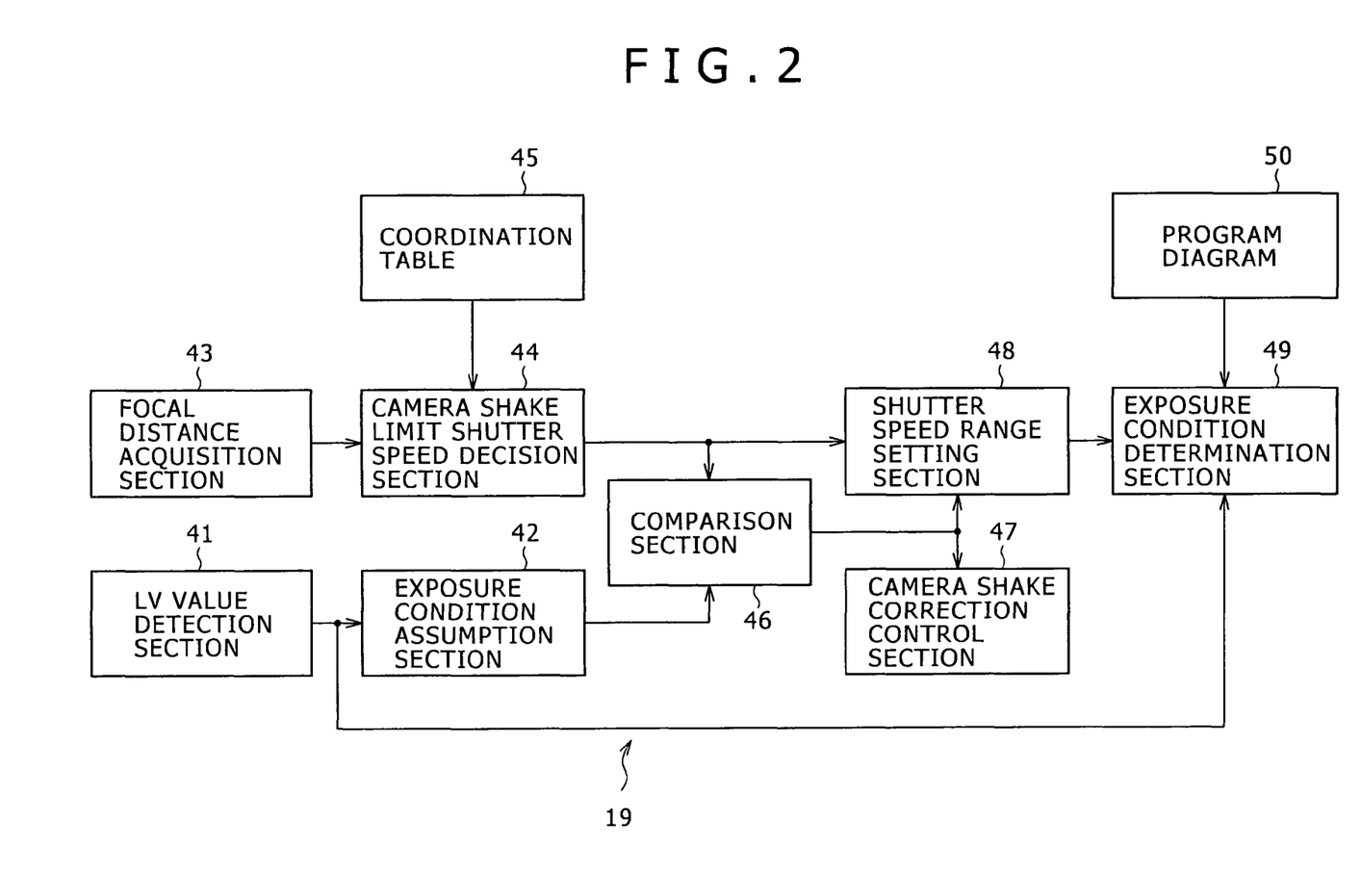
FIG. 2 is a block diagram showing an example of a configuration of functional blocks implemented by a main control section shown in FIG. 1.

According to an embodiment of the present invention, there is provided an image pickup apparatus (for example, a digital still camera 1 of FIG. 1) which includes a camera shake correction mechanism and determines exposure conditions including at least a shutter speed T in response to brightness of an image pickup object, including an acquisition section (for example, a focal distance acquisition section 43 shown in FIG. 2) configured to acquire a focal distance f of a lens for converging an optical image of the image pickup object, a decision section (for example, a camera shake limit shutter speed decision section 44 shown in FIG. 2) configured to decide a camera shake limit shutter speed Ts corresponding to the acquired focal distance f, and a setting section (for example, a shutter speed range setting section 48 shown in FIG. 2) configured to set, where the camera shake correction mechanism is valid, a shutter speed Ts' lower than the camera shake limit shutter speed Ts by an amount corresponding to a predetermined difference ΔEV in exposure value to one end of a setting range of the shutter speed T of the exposure condition.

The image pickup apparatus may further include a detection section (for example, an LV value detection section 41 shown in FIG. 2) configured to detect an LV value which indicates the brightness of the image pickup object, an assumption section (for example, an exposure condition assumption section 42 shown in FIG. 2) configured to assume a reference shutter speed Te corresponding to the detected LV value, a comparison section (for example, a comparison section 46 shown in FIG. 2) configured to compare the assumed reference shutter speed Te with the camera shake limit shutter speed Ts, and a camera shake correction control section (for example, a camera shake correction control section 47 shown in FIG. 2) configured to control setting of validity or invalidity of the camera shake correction mechanism in response to a result of the comparison by the comparison section.

Figure 3:
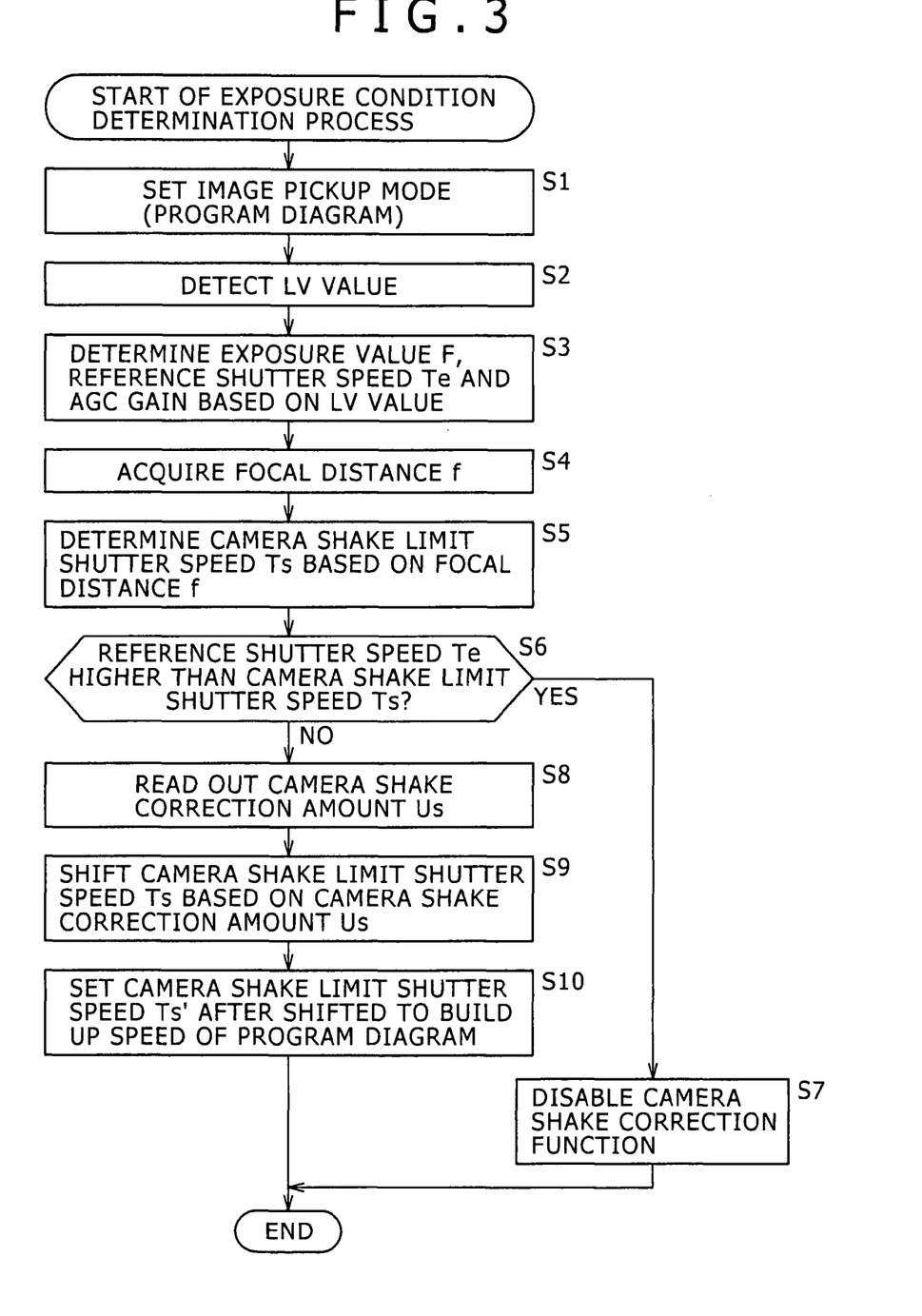
FIG. 3 is a flow chart illustrating an exposure condition determination process by the main control section.

According to another embodiment of the present invention, there are provided an image pickup method including the steps of acquiring a focal distance f of a lens for converging an optical image of the image pickup object (for example, step S4 of FIG. 3), deciding a camera shake limit shutter speed Ts corresponding to the acquired focal distance f (for example, step S5 of FIG. 3), and setting, where the camera shake correction mechanism is valid, a shutter speed Ts' lower than the camera shake limit shutter speed Ts by an amount corresponding to a predetermined difference ΔEV in exposure value to one end of a setting range of the shutter speed T of the exposure condition (for example, step S10 of FIG. 3).

According to a further embodiment of the present invention, there is provided a program which causes a computer to execute a process which includes steps same as those of the image pickup method described above.

In the following, a particular embodiment to which the present invention is applied is described in detail with reference to the drawings.

FIG. 1 shows an example of a configuration of a digital still camera to which the present invention is applied. Referring to FIG. 1, the digital still camera 1 shown includes an image pickup lens 11 having a variable focal distance for converging incoming light corresponding to an optical image of an image pickup object. The digital still camera 1 further includes an iris mechanism section 12 for adjusting the iris amount, a shutter mechanism section 13 for limiting exposure time by the incoming light, and a CCD unit 14 for producing image data from the incoming light through photoelectric conversion. The digital still camera 1 further includes an analog signal processing section 15 for performing a sampling process and an AGC (Auto Gain Control) process for the image data, and an analog/digital conversion section (A/D) 16 for converting the image data in the form of an analog signal into digital data of a digital signal. The digital still camera 1 further includes a digital signal processing section 17 for performing a through image production process, an AF (Auto Focus) process, an AE (Auto Exposure) process, a recording image production process and so forth. The digital signal processing section 17 has a camera shake correction section 18 built therein for performing a camera shake correction process for image data which suffers from a camera shake. The digital still camera 1 further includes a main control section 19 for executing a program recorded in a ROM 20 to control the components of the digital still camera 1.

The ROM (Read Only Memory) 20, a RAM (Random Access Memory) 21, an operation inputting section 22, a display section 23, a recording section 24, an external interface (I/F) 25, a light emitting section 26, a timing generator (TG) 27 and a lens control section 28 are connected to the main control section 19. The ROM 20 has a control program, various initial setting values and so forth recorded therein.

The RAM 21 is used as a working area of the main control section 19 and temporarily stores image data. The operation inputting section 22 receives various operations from the user. The display section 23 serves as a finder to display a through image and display a recording image. The recording section 24 records encoded image data obtained as a result of the recording image production process on a recording medium. The external interface 25 establishes a connection to an external electronic apparatus such as a personal computer, a television receiver or the like. The light emitting section 26 irradiates light on an image pickup object where the luminance is insufficient or the like. The timing generator 27 controls the operation timing of the CCD unit 14. The lens control section 28 controls the image pickup lens 11.

Next, operation of the digital still camera 1 is described.

When a still picture image is photographed, an optical image of an image pickup object is introduced the CCD unit 14 through the image pickup lens 11, iris mechanism section 12 and shutter mechanism section 13 so that analog image data is produced by the CCD unit 14. The image data undergoes an analog signal process by the analog signal processing section 15 and is then converted into a digital signal by the A/D converter 16. Then, the digital signal is supplied to the digital signal processing section 17. In the digital signal processing section 17, the through image production process is performed based on the digital image data and a through image obtained by the through image production process is displayed on the display section 23. Further, the AE process is performed by the digital signal processing section 17, and an AE signal which is obtained by the AE process and indicates an optical amount in a predetermined region of the image data is supplied to the main control section 19. Then, exposure conditions including an iris amount, a shutter speed, an amplification gain of the AGC process and so forth are determined.

Then, if the user performs a shutter operation, then image pickup is performed in accordance with the determined exposure conditions to produce digital image data, and the camera shake correction process is suitably performed for the produced digital image data. Thereafter, the recording image production process is performed, and encoded image data obtained by the recording image production process is recorded on a recording medium by the recording section 24. It is to be noted that details of determination of the exposure conditions are hereinafter described.

FIG. 2 particularly shows an example of a configuration of functional blocks for determination of the exposure conditions from among the functional blocks implemented by the program recorded in the ROM 20 and executed by the main control section 19. It is to be noted that the functional blocks shown in FIG. 2 may be configured by hardware.

An LV value detection section 41 detects an LV value which indicates the brightness of an image pickup object based on the AE signal inputted from the digital signal processing section 17. An exposure condition assumption section 42 compares the detected LV value with a predetermined threshold value and assumes exposure conditions in response to the difference between the LV value and the threshold value. For example, if the detected LV value is lower than the predetermined threshold value, then since the exposure is insufficient, such a process as to decrease the shutter speed, decrease the iris amount or increase the amplification gain of the AGC process is performed. On the other hand, if the detected LV value is higher than the predetermined threshold value conversely, then the exposure is excessive. Therefore, such a process as to increase the shutter speed, increase the iris amount or decrease the amplification gain of the AGC process. From among the assumed exposure conditions described above, the shutter speed is determined as a reference shutter speed Te.

A focal distance acquisition section 43 acquires the focal distance f of the image pickup lens 11 through the lens control section 28. A camera shake limit shutter speed decision section 44 refers to a coordination table 45, which indicates camera shake limit shutter speeds coordinated with focal distances, to decide a camera shake limit shutter speed Ts corresponding to the acquired focal distance f. It is to be noted that the coordination table 45 is retained, for example, in the ROM 20.

A comparison section 46 compares a reference shutter speed Te assumed as an exposure condition with the camera shake limit shutter speed Ts. A camera shake correction control section 47 controls the camera shake correction section 18 so as not to operate when the reference shutter speed Te is higher than the camera shake limit shutter speed Ts. A shutter speed range setting section 48 decides a camera shake limit shutter speed Ts' with reference to the camera shake limit shutter speed Ts when the reference shutter speed Te is equal to or lower than the camera shake limit shutter speed Ts.

An exposure condition determination section 49 uses a program diagram 50 corresponding to an image pickup mode designated by the user to limit the low speed side end of the shutter speed to the camera shake limit shutter speed Ts' and determines exposure conditions based on a detected LV value. It is to be noted that such program diagrams 50 which correspond to various image pickup modes which can be set in the digital still camera 1 are retained in advance, for example, in the ROM 20.

Now, an exposure condition determination process by the main control section 19 is described with reference to a flow chart of FIG. 3.

First at step S1, the exposure condition determination section 49 reads out a program diagram 50 which corresponds to the image pickup mode such as, for example, a portrait mode, a sport mode, a distant view mode or a night view mode set by the user from the ROM 20.

At step S2, the LV value detection section 41 detects an LV value representative of the brightness of an image pickup object based on an AE signal inputted thereto from the digital signal processing section 17 and outputs the detected LV value to the exposure condition assumption section 42. Then at step S3, the exposure condition assumption section 42 compares the detected LV value with a predetermined threshold value and assumes exposure conditions including the reference shutter speed Te in response to the difference obtained by the comparison. Then, the exposure condition assumption section 42 outputs the assumed exposure conditions to the comparison section 46. At step S4, the focal distance acquisition section 43 acquires the focal distance f of the image pickup lens 11 through the lens control section 28 and supplies the acquired focal distance f to the camera shake limit shutter speed decision section 44.

Figure 4:
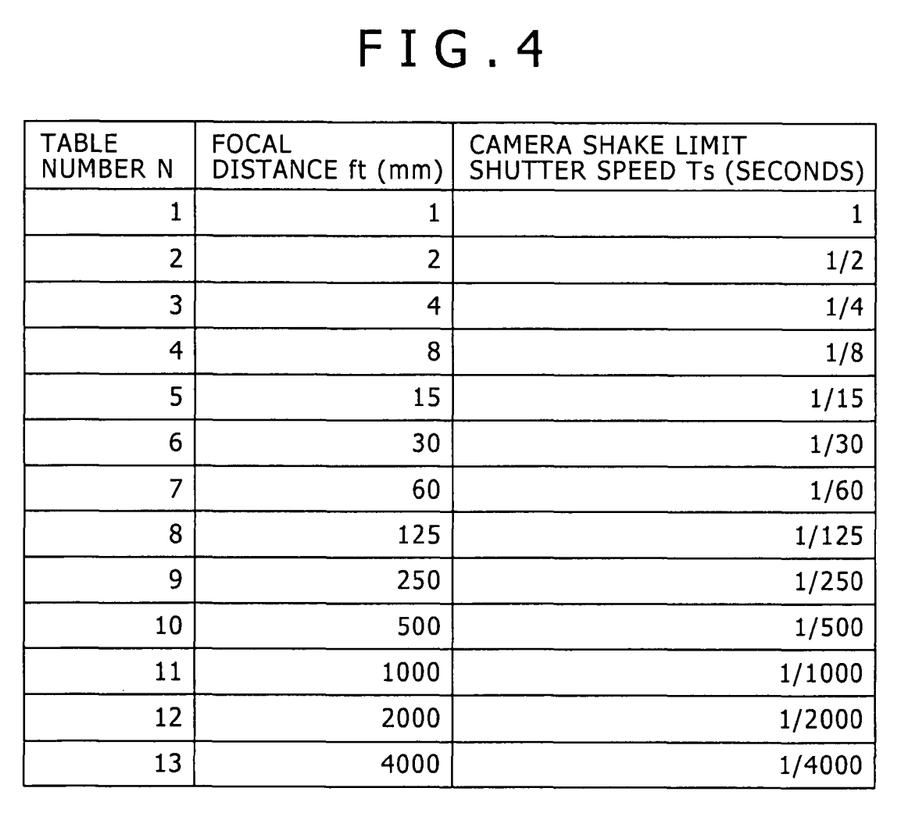
FIG. 4 is a view showing an example of a coordination table shown in FIG. 2.

At step S5, the camera shake limit shutter speed decision section 44 refers to the coordination table 45 regained in the ROM 20 to decide the camera shake limit shutter speed Ts corresponding to the focal distance f supplied thereto, and outputs the camera shake limit shutter speed Ts to the comparison section 46. In the coordination table 45, for example, a focal distance ft and a camera shake limit shutter speed Ts are recorded for each table number N as seen in FIG. 4. It is to be noted that the difference between camera shake limit speeds Ts corresponding to the table numbers (for example, the difference between the shutter speeds ½ and ¼ or the difference between the shutter speeds ¼ and ⅛) corresponds to 1 EV (Exposure Value).

More particularly, the camera shake limit shutter speed decision section 44 successively compares the focal distance ft and the focal distance f for the successive table numbers from the table number N=1 and successively counts up the table number N until the focal distance ft exceeds the focal distance f. Then, the camera shake limit shutter speed Ts when it is detected that the focal distance ft exceeds the focal distance f is determined as the object camera shake limit shutter speed Ts.

For example, where the focal distance f of the image pickup lens 11 is 30 millimeter, the camera shake limit shutter speed Ts of the table number N=6 is Ts=1/30 second. Further, for example, where the focal distance f of the image pickup lens 11 is 90 millimeter, the camera shake limit shutter speed Ts of the table number N=8 is Ts=1/125 second.

At step S6, the comparison section 46 compares the reference shutter speed Te assumed as the exposure conditions with the camera shake limit shutter speed Ts and outputs a result of the comparison to the camera shake correction control section 47 and the shutter speed range setting section 48.

If the assumed reference shutter speed Te is higher than the camera shake limit shutter speed Ts at step S6, then the processing advances to step S7. At step S7, the camera shake correction control section 47 controls the camera shake correction section 18 so as not to operate. Since the power consumption can be reduced by blocking the camera shake correction section 18 from operation in this manner, the effect that extension of the effective duration of the battery can be expected. Thereafter, the exposure condition determination section 49 decides exposure conditions based on the detected LV value based on the program diagram 50 read out at step S1.

On the contrary, if the assumed reference shutter speed Te is equal to or lower than the camera shake limit shutter speed Ts at step S6, then the processing advances to step S8. At step S8, the shutter speed range setting section 48 reads out a camera shake correction amount Us retained in advance in the ROM 20. The camera shake correction amount Us is a value which depends upon the correction performance of the camera shake correction section 18.

Then at step S9, the shutter speed range setting section 48 shifts the camera shake limit shutter speed Ts to the lower side by an amount corresponding to the camera shake correction amount Us to determine a camera shake limit shutter speed Ts', and outputs the determined camera shake limit shutter speed Ts' to the exposure condition determination section 49. For example, where the camera shake limit shutter speed Ts is Ts=1/30 and the camera shake correction amount Us is Us=3, the shutter speed range setting section 48 shifts the camera shake limit shutter speed Ts to the lower side by 3 EVs thereby to obtain a camera shake limit shutter speed Ts'=¼. Further, for example, where the camera shake limit shutter speed Ts is Ts=1/60 and the camera shake correction amount Us is Us=2, the shutter speed range setting section 48 shifts the camera shake limit shutter speed Ts to the lower side by 2 EVs thereby to obtain a camera shake limit shutter speed Ts'=1/15.

Figure 5:
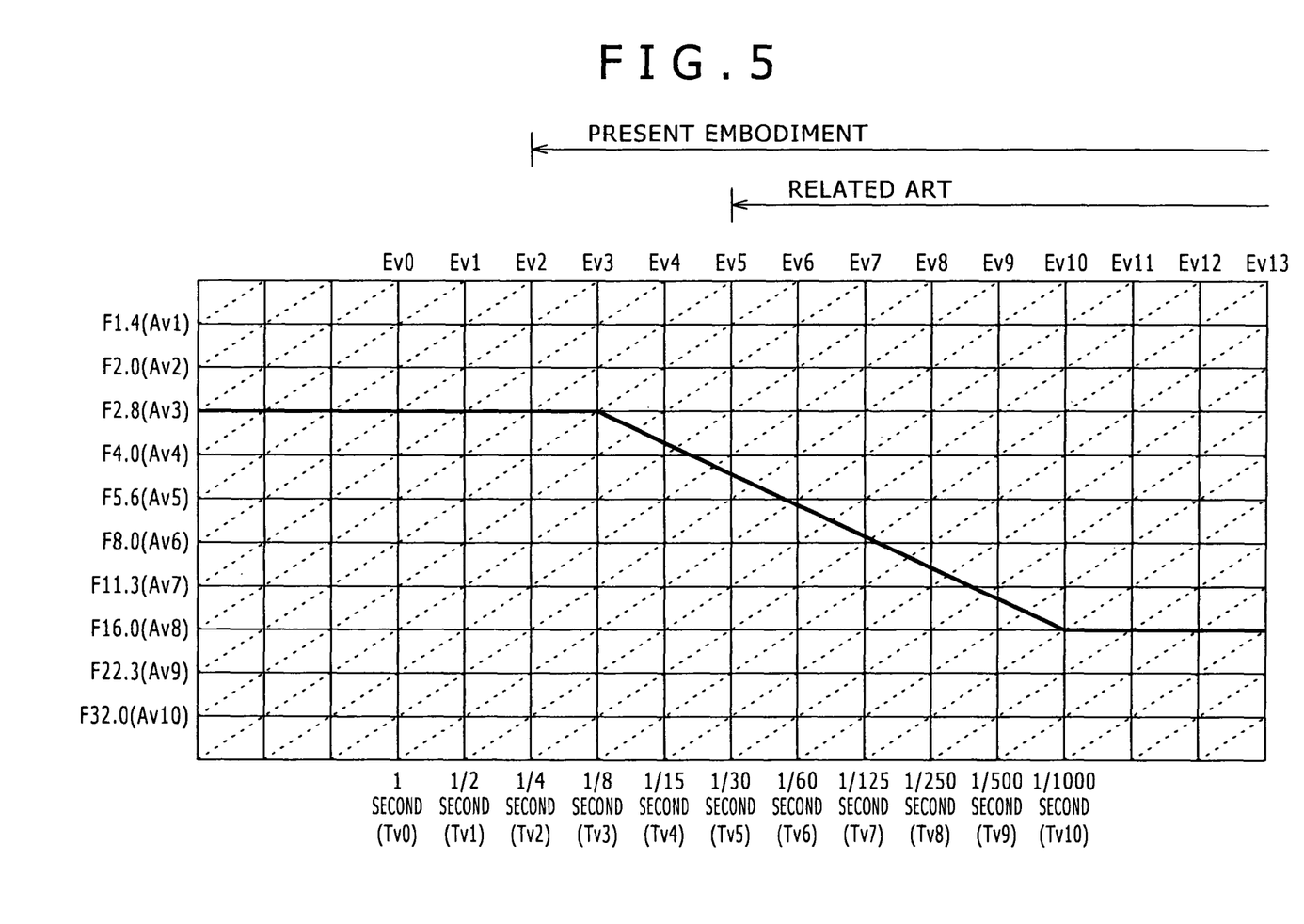
FIG. 5 is a view showing an example of a program diagram.

At step S10, the exposure condition determination section 49 restricts the low speed side end of the shutter speed to the camera shake limit shutter speed Ts' on the program diagram 50 read out at step S1 and determines exposure conditions based on the detected LV value. For example, where the focal distance f of the image pickup lens 11 is f=30 mm and the open iris value is F2.8 and besides the program diagram 50 is such as shown in FIG. 5, the exposure conditions are determined within a range higher than ¼.

It is to be noted that, where camera shake correction is not taken into consideration as in information processing apparatus in the related art, the camera shake limit shutter speed Ts=1/30 determined based on the focal distance f=30 millimeter is determined as the low speed side end of the shutter speed. In contrast, in the present embodiment, the setting range of exposure conditions is expanded from the setting range in the related art. Accordingly, in the present embodiment, an appropriate exposure amount can be obtained when compared with that in the information processing apparatus in the related art.

Figure 6:
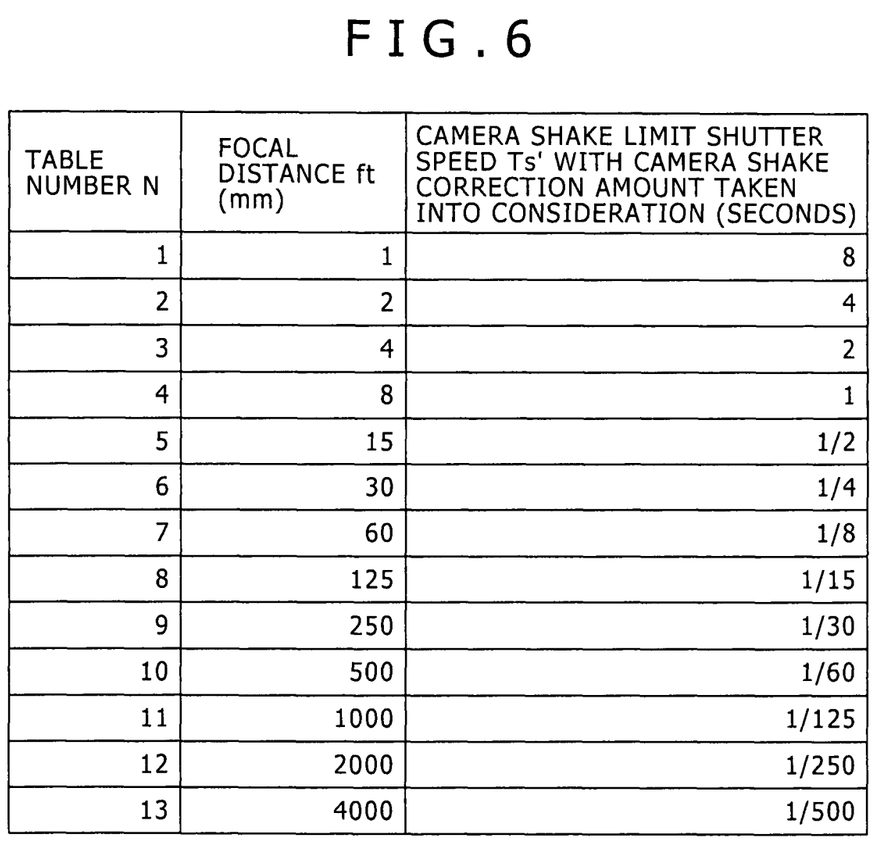
FIG. 6 is a view showing another example of the coordination table.

The exposure condition determination process by the main control section 19 is such as described above. It is to be noted that, for example, such a coordination table wherein camera shake limit speeds Ts are shifted to the lower speed side by amounts corresponding to camera shake correction amounts Us as shown in FIG. 6 may be retained in the ROM 20 or the like in advance so as to be referred to later.

Further, the coordination table 45 may include not such shutter speed values at pitches of one EV as seen in FIG. 4 but shutter speed values at finer pitches such as, for example, at pitches of ⅓EV.

Further, while, in the present embodiment, the camera shake correction process is performed electronically, it may otherwise be performed optically. In other words, in place of or in addition to the camera shake correction process performed as part of the digital signal process, another camera shake correction process may be performed using a gyro sensor for detecting a camera shake and a shift lens for deflecting the optical axis in response to a result of the detection by the gyro sensor.

Where the optical camera shake correction mechanism is controlled so as not to operate, comparatively high power consumption necessary for driving of the shift lens can be reduced.

It is to be noted that the present invention can be applied not only to such a digital still camera as in the present embodiment but also to a video camera and a camera of the film type.

It is to be noted that, in the present specification, the steps which are executed based on the program may be but not necessarily be processed in a time series in the order as described, and include processes which are executed in parallel or individually without being processed in a time series.

Further, the program may be processed by a single computer or may otherwise be processed discretely by a plurality of computers. Further, the program may be transferred to and executed by a computer at a remote place.

Further, in the present specification, the term "system" is used to represent an entire apparatus composed of a plurality of apparatus.

While a preferred embodiment of the present invention has been described using specific terms, such description is for illustrative purposes only, and it is to be understood that changes and variations may be made without departing from the spirit or scope of the following claims.

What is claimed is:

1. An image pickup apparatus that includes a camera shake correction mechanism and determines exposure conditions including at least a reference shutter speed in response to brightness of an image pickup object, comprising:
   acquisition means configured to acquire a focal distance of a lens for converging an optical image of the image pickup object;

decision means configured to determine a camera shake limit shutter speed corresponding to the acquired focal distance, wherein said decision means determines the camera shake limit shutter speed corresponding to the acquired focal distance based on a table retained in advance and indicates a coordination relationship between the focal distance and camera shake limit shutter speed; and setting means configured to set a shutter speed to a speed that is lower than the camera shake limit shutter speed when the camera shake correction mechanism is valid, wherein the set shutter speed is lower than the camera shake limit shutter speed according to a predetermined difference in an exposure value.

2. The image pickup apparatus according to claim 1, wherein the predetermined difference in the exposure value is determined in advance in response to a correction capacity of said camera shake correction mechanism.

3. The image pickup apparatus according to claim 1, further comprising:

detection means configured to detect a light value which indicates the brightness of the image pickup object;

assumption means configured to assume a reference shutter speed corresponding to the detected light value;

comparison means configured to compare the assumed reference shutter speed with the camera shake limit shutter speed; and camera shake correction control means configured to control setting of validity or invalidity of said camera shake correction mechanism in response to a result of the comparison by said comparison means.

4. The image pickup apparatus according to claim 3, wherein said camera shake correction control means invalidates said camera shake correction mechanism where the assumed reference shutter speed is higher than the camera shake limit shutter speed.

5. An image pickup method for an image pickup apparatus which includes a camera shake correction mechanism and determines exposure conditions including at least a shutter speed in response to brightness of an image pickup object, comprising:

acquiring a focal distance of a lens for converging an optical image of the image pickup object;

determining a camera shake limit shutter speed corresponding to the acquired focal distance; and setting means configured to set a shutter speed to a speed that is lower than the camera shake limit shutter speed when camera shake correction mechanism is valid, wherein the set shutter speed is lower than the camera shake limit shutter speed according to a predetermined difference in an exposure value.

6. A non-transitory computer readable medium storing a program code that when executed by a computer performs operations for controlling an image pickup apparatus that includes a camera shake correction mechanism and determines exposure conditions including at least a shutter speed in response to brightness of an image pickup object, the program code causing a computer to execute a process, comprising:

acquiring a focal distance of a lens for converging an optical image of the image pickup object;

determining a camera shake limit shutter speed corresponding to the acquired focal distance based on a table retained in advance and indicating a coordination relationship between the focal distance and camera shake limit shutter speed; and setting means configured to set a shutter speed to a speed that is lower than the camera shake limit shutter speed when the camera shake correction mechanism is valid, wherein the set shutter speed is lower than the camera shake limit shutter speed according to a predetermined difference in an exposure value.

7. An image pickup apparatus which includes a camera shake correction mechanism and determines exposure conditions including at least a shutter speed in response to brightness of an image pickup object, comprising:

an acquisition section configured to acquire a focal distance of a lens for converging an optical image of the image pickup object;

a decision section configured to determine a camera shake limit shutter speed corresponding to the acquired focal distance, wherein said decision section determines the camera shake limit shutter speed corresponding to the acquired focal distance based on a table retained in advance and indicates a coordination relationship between the focal distance and camera shake limit shutter speed; an setting means configured to set a shutter speed to a speed that is lower than the camera shake limit shutter speed when the camera shake correction mechanism is valid, wherein the set shutter speed is lower than the camera shake limit shutter speed according to a predetermined difference in an exposure value.

8. An image pickup apparatus, comprising:

a camera shake correction mechanism;

a detection means configured to detect a value that indicates the brightness of an image pickup object a exposure condition assumption means configured to determine at least a reference shutter speed in response to brightness of the image pickup object;

an acquisition means configured to acquire a focal distance of a lens for converging an optical image of the image pickup object;

a decision means configured to determine a camera shake limit shutter speed corresponding to the acquired focal distance, wherein said decision means determines the camera shake limit shutter speed corresponding to the acquired focal distance based on a table retained in advance and indicates a coordination relationship between the focal distance and camera shake limit shutter speed; and a setting means configured to set a shutter speed to a speed that is lower than the camera shake limit shutter speed when the camera shake correction mechanism is valid, wherein the set shutter speed is lower than the camera shake limit shutter speed according to a predetermined difference in an exposure value; and a determination means configured limit the low speed side end of the shutter speed to the camera shake limit shutter speed and determine exposure conditions based on based on the value detected by the detection means.

* * * * *